United States Patent
Kierzenka et al.

(10) Patent No.: US 7,739,081 B1
(45) Date of Patent: Jun. 15, 2010

(54) MODELING LINEARLY-IMPLICIT SYSTEMS IN BLOCK DIAGRAM MODELING ENVIRONMENTS

(75) Inventors: Jacek Kierzenka, Framingham, MA (US); Jeff Wendlandt, Newton, MA (US)

(73) Assignee: The Math Works, Inc., Natick, MA (US)

( * ) Notice: Subject to any disclaimer, the term of this patent is extended or adjusted under 35 U.S.C. 154(b) by 808 days.

(21) Appl. No.: 10/903,168

(22) Filed: Jul. 30, 2004

(51) Int. Cl.
*G06F 7/60* (2006.01)
*G06G 7/48* (2006.01)

(52) U.S. Cl. .............................. 703/2; 703/6
(58) Field of Classification Search .............. 703/2, 703/6
See application file for complete search history.

(56) References Cited

U.S. PATENT DOCUMENTS

| | | | | |
|---|---|---|---|---|
| 5,424,963 A * | 6/1995 | Turner et al. | ................... | 703/6 |
| 5,960,187 A * | 9/1999 | Faille et al. | ................... | 703/12 |
| 6,077,302 A * | 6/2000 | Kumra et al. | ................. | 703/7 |
| 6,810,370 B1 * | 10/2004 | Watts, III | ..................... | 703/10 |

OTHER PUBLICATIONS

MathWorks, Inc, "MatLab the Language of Technical Computing", Using MATLAB Version 5, 1999.*
MathWorks, MATLAB Function Reference (vol. 2: Graphics) Version 5, Dec. 1997.*
MathWorks, "Using Simulink Version 2.2", Dec. 19, 1997 (pdf date).*
Smart, "The MathWorks introduces Simulink 2—Industrial strength simulation software for complex systems design", Business Wire, http://findarticles.com/p/articles/mi_m0EIN/is_1997_Feb_24/ai_19145501/print?tag=artBody;col. 1, 1997.*
Lawrence Shampine, "The Matlab ODE Suite", Mathworks.com, http://www.mathworks.com/access/helpdesk/help/pdf_doc/otherdocs/ode_suite.pdf, 1997.*
Martin Schlegel, "Sensitivity analysis of linearly-implicit differential-algebraic systems by one-step extrapolation", kobv.de, http://opus.kobv.de/zib/volltexte/2002/706/pdf/ZR-02-38.pdf, 2002.*
The MathWorks, "Simulink® Control Design, Getting Started, Version 1," the MathWorks, Inc. (2004).
The MathWorks, "Stateflow and Stateflow Coder, For Use with Simulink®, User's Guide, Version 6," the MathWorks, Inc. (2004).

* cited by examiner

*Primary Examiner*—Kamini S Shah
*Assistant Examiner*—David Silver
(74) *Attorney, Agent, or Firm*—Lahive & Cockfield, LLP; Kevin J. Canning

(57) ABSTRACT

Methods for modeling and executing systems in a linearly-implicit formulation of ordinary differential equations (ODEs) or differential algebraic equations (DAEs) are provided in modeling environments. The modeling environments may include block diagram modeling environments, such as time-based block diagram modeling environments. The block diagram modeling environments may include or be coupled to other modeling environments, such as physical modeling environments, so that models created in other modeling environments may also be introduced and solved in the linearly-implicit formulation of ODEs or DAEs in the block diagram modeling environments. Models describing the systems in the linearly-implicit formulation of ODEs or DAEs may also be created directly by users using user-defined blocks in the block diagram modeling environments. The present invention provides solvers for solving the system described in the linearly-implicit formulation of DAEs as well as ODEs in the block diagram modeling environment.

40 Claims, 7 Drawing Sheets

MODELING LINEARLY-IMPLICIT SYSTEMS IN BLOCK DIAGRAM MODELING ENVIRONMENTS

FIELD OF THE INVENTION

The present invention relates generally to modeling environments and more particularly to modeling and executing systems in a linearly-implicit formulation of ordinary differential equations (ODEs) or differential algebraic equations (DAEs) in block diagram modeling environments.

BACKGROUND OF THE INVENTION

Various classes of block diagrams describe computations that can be performed on application specific computational hardware, such as a computer, microcontroller, FPGA, and custom hardware. Classes of such block diagrams include time-based block diagrams, such as those found within Simulink®, from The MathWorks, Inc. of Natick, Mass., state-based and flow diagrams, such as those found within Stateflow®, from The MathWorks, Inc. of Natick, Mass., and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages, such as Simulink®. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

The various kinds of dynamic systems mentioned above may be described in an explicit or implicit formulation of ODEs. In many applications including simulating physical systems, the dynamic systems may also be described in a linearly-implicit formulation of ODEs. Therefore, it is desired to model and execute dynamic systems described in a linearly-implicit formulation of ODEs within block diagram modeling environments.

SUMMARY OF THE INVENTION

The present invention provides methods for modeling and executing systems described in a linearly-implicit formulation of ordinary differential equations (ODEs) or differential algebraic equations (DAEs) in modeling environments. The modeling environments may include block diagram modeling environments, such as time-based block diagram modeling environments, state-based and flow diagram modeling environments and data-flow diagram modeling environments. The block diagram modeling environments may include or be coupled to other modeling environments, such as physical modeling environments, so that models created in other modeling environments may also be described and solved in the linearly-implicit formulation of ODEs or DAEs in the block diagram modeling environments. The present invention may also enable users to create the models of the systems in the linearly-implicit formulation of ODEs or DAEs by using user-defined blocks provided in the block diagram modeling environments. Systems that include algebraic loops in a block diagram representation may be described in a linearly-implicit formulation of DAEs. The present invention provides solvers for solving the linearly-implicit formulation of ODEs or DAEs in the block diagram modeling environment. The models of the systems may be executed by solving the linearly-implicit formulation of ODEs or DAEs that describe the systems in the block diagram modeling environment.

In one aspect of the present invention, a method is provided for modeling a system in a block diagram modeling environment. The method describes the system in a linearly-implicit formulation of ordinary differential equations using a block that represents the system in the block diagram modeling environment. The system is executed in the linearly-implicit formulation of ordinary differential equations in the block diagram modeling environment.

In another aspect of the present invention, a method is provided for modeling a system in a block diagram modeling environment, wherein the system is described in a linearly-implicit formulation of ODEs $M(t,x,y)\dot{x}=f(t,x,y)$, wherein t, x, y, and $M(t,x,y)$ represent time, states, outputs and a mass matrix, respectively. The method declares a type of the mass matrix and a number of non-zero elements in the mass matrix. The method also defines a sparsity structure of the mass matrix. A first function for evaluating $M(t,x,y)$ and a second function for evaluating $f(t,x,y)$ are provided to model the system.

In still another aspect of the present invention, a medium is provided for holding instructions executable in an electronic device for modeling a system in a block diagram modeling environment. The system is described in a linearly-implicit formulation of ordinary differential equations using a block that represents the system in the block diagram modeling environment. The system is executed in the block diagram modeling environment wherein the system is executed in a linearly-implicit formulation of ordinary differential equations.

In yet still another aspect of the present invention, a medium is provided for modeling a system in a block diagram modeling environment, wherein the system is described in a linearly-implicit formulation of ODEs $M(t,x,y)\dot{x}=f(t,x,y)$, wherein t, x, y, and $M(t,x,y)$ represent time, states, outputs and a mass matrix, respectively. The type of the mass matrix and the number of non-zero elements in the mass matrix are declared. A sparsity structure of the mass matrix is defined. A first function for evaluating $M(t,x,y)$ and a second function for evaluating $f(t,x,y)$ are provided to model the system.

By providing block diagram modeling environments that can model and execute systems in a linearly-implicit formulation of ODEs or DAEs, the present invention provides convenient modeling environments that may be used in much more applications including simulating physical systems. In particular, by solving systems described in a linearly-implicit formulation of DAEs, the present invention provides a general method for solving systems with algebraic loops in the block diagram representation of the systems.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
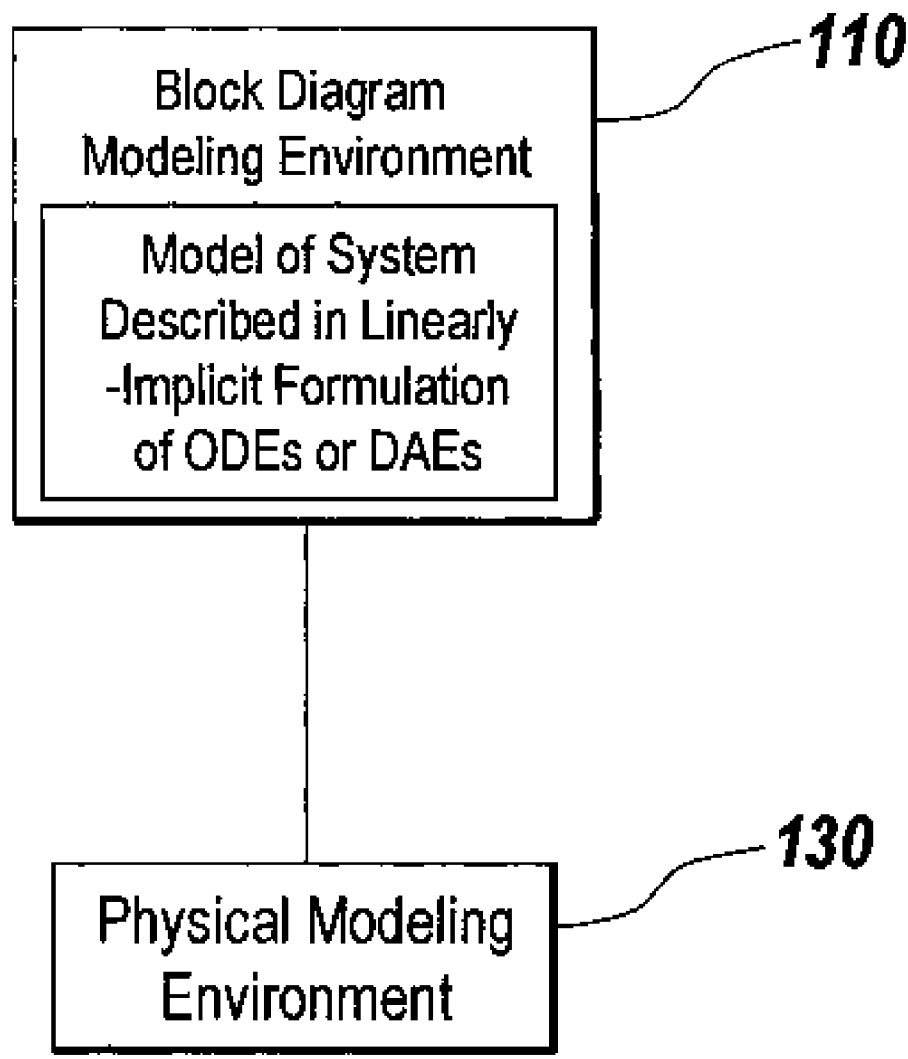
FIG. 1 depicts an exemplary block diagram modeling environment in which systems are modeled in a linearly-implicit formulation in the illustrative embodiment of the present invention.

The illustrative embodiment of the present invention concerns modeling and execution of systems in a block diagram modeling environment. Systems are typically modeled as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical modeling system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example, a parameter is the values of the filter taps.

Ordinary differential equations (ODEs) are often used to describe the systems. The system specifies a set of two functions including an Output and a Derivative. The Output facilitates the computation of the system's output response at a given time instant as a function of its inputs, states, parameters, and time. The Derivative allows the computation of the derivative of the states at the current time as a function of the inputs, the states, parameters, and time. This class of models is suitable for systems in which it is important to track the system response as a continuous function of time. Such systems are commonly representative of physical systems (mechanical, thermal, electrical). For simple systems, it may be possible to use the Output and Derivative to obtain a closed-form solution for the output response. But in most complex real world systems, the response of the system is obtained by numerical means.

The ODE may include an implicit formulation of $F(t,\dot{x},x,y)=0$ and an explicit formulation of $\dot{x}=f(t,x,y)$. The class of ODEs may require additional functions to define the system being modeled. For example, functions called Projections may be required to impose constraints on the differential variables (e.g., states $X_1$ and $X_2$ must fall on the manifold defined by $X_1^2+X_2^2=25$). These constraints can be either applied as a secondary condition or a coupled condition to the differential equation. Although systems including the Projections may conventionally no longer qualify as an ODE, they are included here to simplify the categories of systems. Another example is the use of a Jacobian that defines partial derivatives with respect to the independent and/or differential variables. The Jacobian is typically used when obtaining a linear approximation of a non-linear model or an overall linear model of a set of equations. Jacobians are used in some forms of numerical integration, or for producing the linear model once the model has reached its steady state operating point, etc. Jacobians are utilized in the illustrative embodiment of the present invention that will be described below with reference to FIG. 9.

The illustrative embodiment of the present invention describes systems in a linearly-implicit formulation of ODEs as follows.

$$M(t,x,y)\dot{x}=f(t,x,y)$$

In the equation, $M(t,x,y)$ and $f(t,x,y)$ represent a mass matrix and a forcing function, respectively. The systems described in a linearly-implicit formulation of ODEs may be modeled and executed in the block diagram modeling environment. The systems described in the linearly-implicit formulation of ODEs may be executed to simulate the behavior of the systems in the block diagram modeling environment.

The illustrative embodiment of the present invention also describes the system in another linearly-implicit formulation that combines an algebraic Output equation, y=g(t, x, y), and differential Derivative equations, M(t,x,y)ẋ=f(t,x,y), as follows.

$$\begin{bmatrix} M(t, x, y) & 0 \\ 0 & 0 \end{bmatrix} \begin{bmatrix} \dot{x} \\ \dot{y} \end{bmatrix} = \begin{bmatrix} f(t, x, y) \\ y - g(t, x, y) \end{bmatrix}$$

In the equation, the augmented mass matrix, $$\begin{bmatrix} M(t, x, y) & 0 \\ 0 & 0 \end{bmatrix},$$

is singular. Using the linearly-implicit formulation of differential algebraic equations (DAEs), the illustrative embodiment of the present invention may model systems with algebraic loops in the block diagram modeling environment. By using numerical integrators to solve the nonlinear equations, the illustrative embodiment can execute the systems with algebraic loops in the block diagram representation of the systems.

FIG. 1 depicts an exemplary block diagram modeling environment 110 in which systems are modeled in a linearly-implicit formulation in the illustrative embodiment of the present invention. The block diagram modeling environment 110 may include a time-based block diagram modeling environment, such as those found within Simulink®, from The MathWorks, Inc. of Natick, Mass. One of skill in the art will appreciate that the block diagram modeling environment 110 may include other types of modeling environments, such as state-based and flow diagram modeling environments and data-flow diagram modeling environments. One of skill in the art will also appreciate that the present invention may be practiced in other block diagram modeling environments, including but not limited to LabVIEW from National Instruments Corporation of Austin, Tex.

"Block diagram" will be used hereinafter as described above in the Background of the Invention.

The block diagram modeling environment 110 may be coupled to other modeling environments, such as a physical modeling environment 130 that may model physical systems including mechanical and electrical systems. Exemplary physical modeling environments 130 can be found in SimMechanics, from The MathWorks, Inc. of Natick, Mass.

For illustrative purposes only in the discussion below, the illustrative embodiment will be described relative to an implementation that uses Simulink® and SimMechanics.

Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user-interface that allows drafting of block diagram models of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® includes a block diagram editor that allows users to perform such actions as draw, edit, annotate, save, and print out block diagram representations of target systems. The block diagram editor is a graphical user interface (GUI) component that allows drafting of block diagram models by users. In Simulink®, there is also a textual interface with a set of commands that allow interaction with the graphical editor. Using this textual interface, users may write special scripts that perform automatic editing operations on the block diagram. Simulink® also allows users to simulate the designed target systems to determine the behavior of the systems. Simulink® includes a block diagram execution engine that carries out the task of compiling and linking the block diagram to produce an "in-memory executable" version of the model that is used for generating code and/or simulating a block diagram model.

SimMechanics provides tools for modeling mechanical components of physical systems in block diagram modeling environments. SimMechanics provides environments in which users can model and simulate geometric configurations and responses to mechanical stimuli. SimMechanics is part of Simulink® Physical Modeling, encompassing the modeling and design of systems according to basic physical principles. SimMechanics runs within the Simulink® environment and interfaces seamlessly with the rest of Simulink® and with MATLAB®. Within the Simulink® environment, users can use SimMechanics to define and easily modify system's physical parameters, including the position, orientation, and motion of the mechanical components. SimMechanics contains blocks that correspond to physical components, such as bodies, joints, constraints, coordinate systems, actuators, and sensors. Unlike other Simulink® blocks, which represent mathematical operations or operate on signals, SimMechanics blocks represent physical components or relationships directly. The blocks in SimMechanics enable users to model complicated mechanical subsystems found in most physical systems, such as ground vehicles, aircraft, spacecraft, and manufacturing equipment. SimMechanics enables users to design corresponding control systems in Simulink® environment. SimMechanics extends the control design capabilities of Simulink® into the mechanical domain. SimMechanics and Simulink® together provide an integrated environment for modeling multi-domain systems and controllers and evaluating overall system performance, which allows the entire machine/controller system to be modeled in a single environment.

Figure 2:
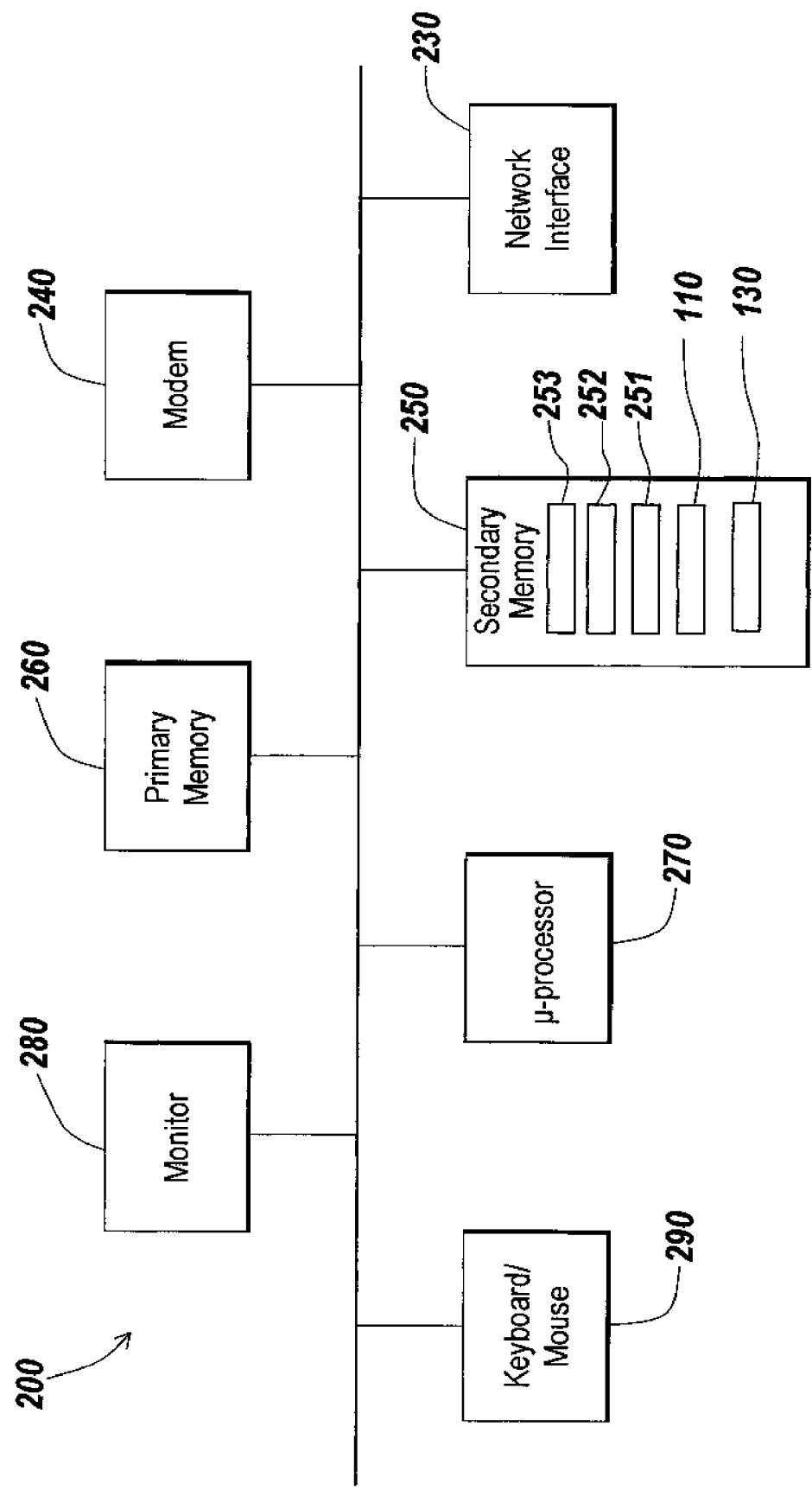
FIG. 2 is an exemplary electronic device suitable for practicing the illustrative embodiment of the present invention depicted in FIG. 1.

FIG. 2 is an exemplary electronic device 200 suitable for practicing the illustrative embodiment of the present invention. The electronic device 200 includes a network interface 230, a MODEM 240, a secondary memory 250, a primary memory 260, a microprocessor 270, a monitor 280 and a keyboard/mouse 290. One of ordinary skill in the art will appreciate that the block diagram modeling environment 110 and the physical modeling environment 130 may be provided in a same electronic device 200 or in separate devices. One of ordinary skill in the art will also appreciate that the block diagram modeling environment 110 and the physical modeling environment 130 provided in separate devices may be connected through communication networks using the MODEM 240 and network interface 230. The network interface 230 and the MODEM 240 enable the electronic device 200 to communicate with other electronic devices through communication networks, such as Internet, intranet, LAN (Local Area Network), WAN (Wide Area Network) and MAN (Metropolitan Area Network). The communication facilities may support the distributed implementations of the present invention. The microprocessor 270 controls each component of the electronic device 200 to run software tools for the modeling environments 110 and 130 properly. The electronic device 200 may receive the input data necessary for modeling and/or executing a system in the modeling environments 110 and 130 through the keyboard/mouse 290. The electronic device 200 may display in the monitor 280 the models generated in the modeling environments 110 and 130. The primary memory 260 fetches from the secondary memory 250 and provides to the microprocessor 270 the codes that need to be accessed by the microprocessor 270 to operate the electronic device 200 and to run the modeling environments 110 and 130. The secondary memory 250 usually contains software tools for applications. The secondary memory 250 may include, in particular, code 251 for the block diagram modeling environment 110, code 252 for the physical modeling environment 130, and code 230 for the systems modeled and executed in the block diagram modeling environment 110.

Figure 3:
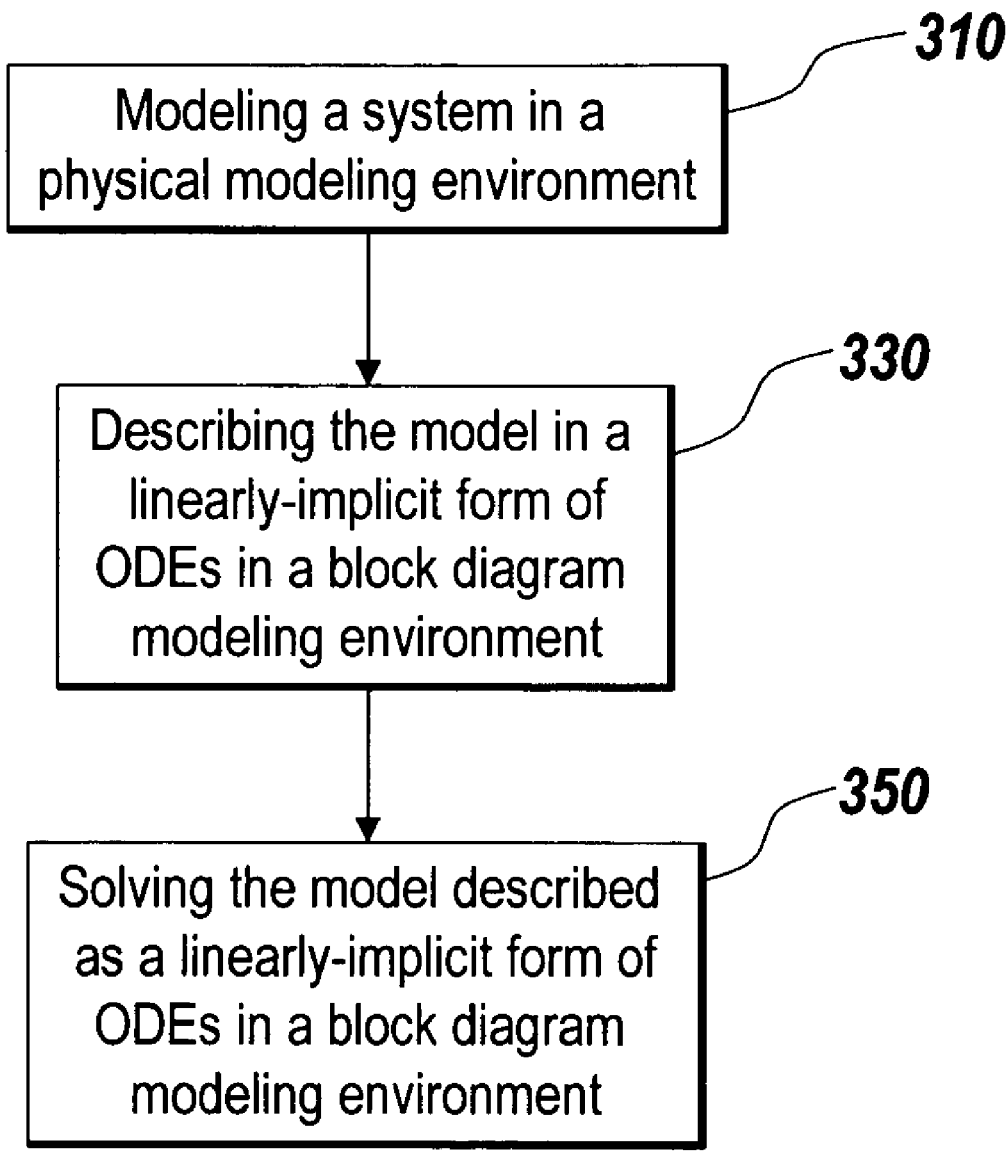
FIG. 3 is a flowchart that shows an exemplary operation for modeling and executing a system in a linearly-implicit formulation of ODEs or DAEs in the illustrative embodiment of the present invention.

FIG. 3 is a flowchart that shows an exemplary operation for modeling and executing systems in a linearly-implicit formulation of ODEs or DAEs in the illustrative embodiment of the present invention. The systems described in a linearly-implicit formulation of ODEs or DAEs may be referred to as "linearly-implicit ODE or DAE systems" in the description of the illustrative embodiment of the present invention. A model may be designed in a physical modeling environment 130, such as in SimMechanics, to represent a physical system including mechanical and electrical systems (step 310). One of skill in the art will appreciate that the physical modeling environment 130 is illustrative and not limiting the scope of the present invention, and the present invention may be applied to models created in other modeling environments.

Figure 4:
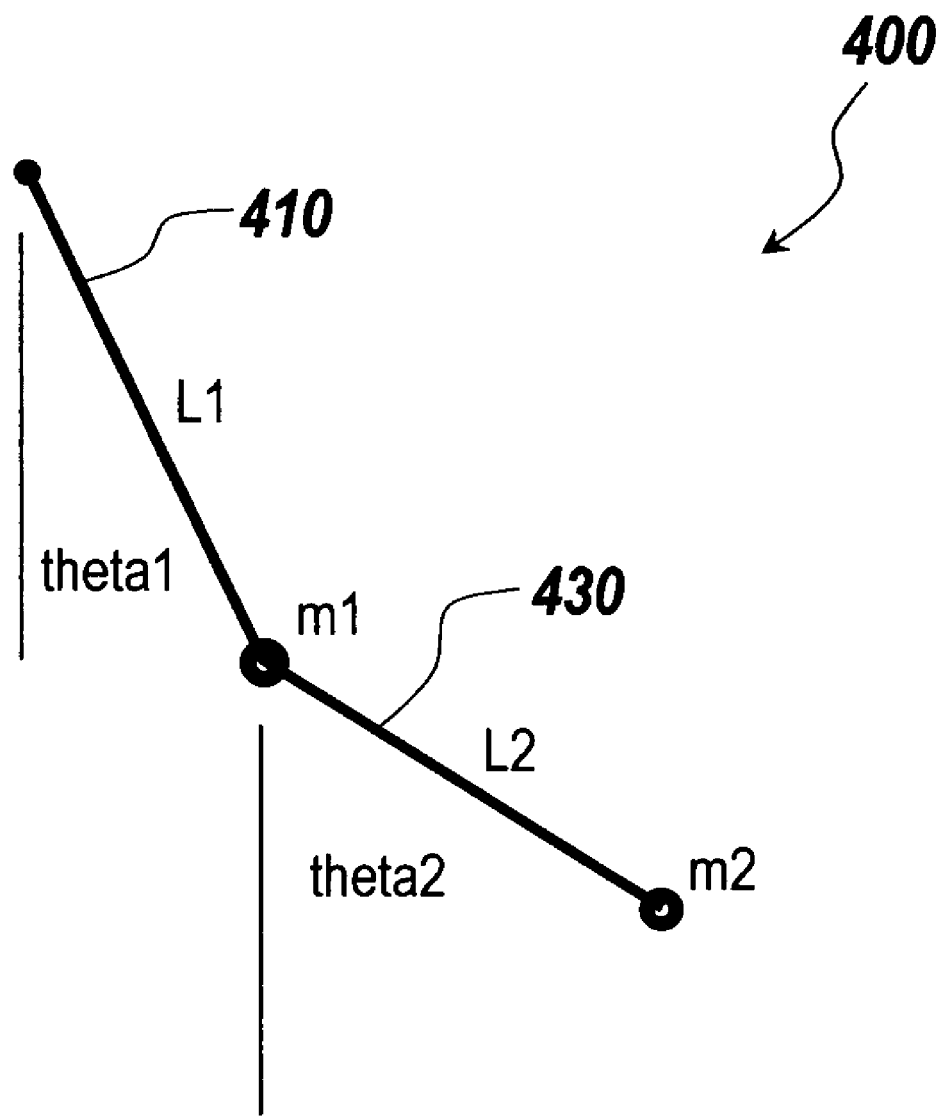
FIG. 4 depicts an exemplary double pendulum system that may be modeled and executed in the illustrative embodiment of the present invention.
Figure 5:
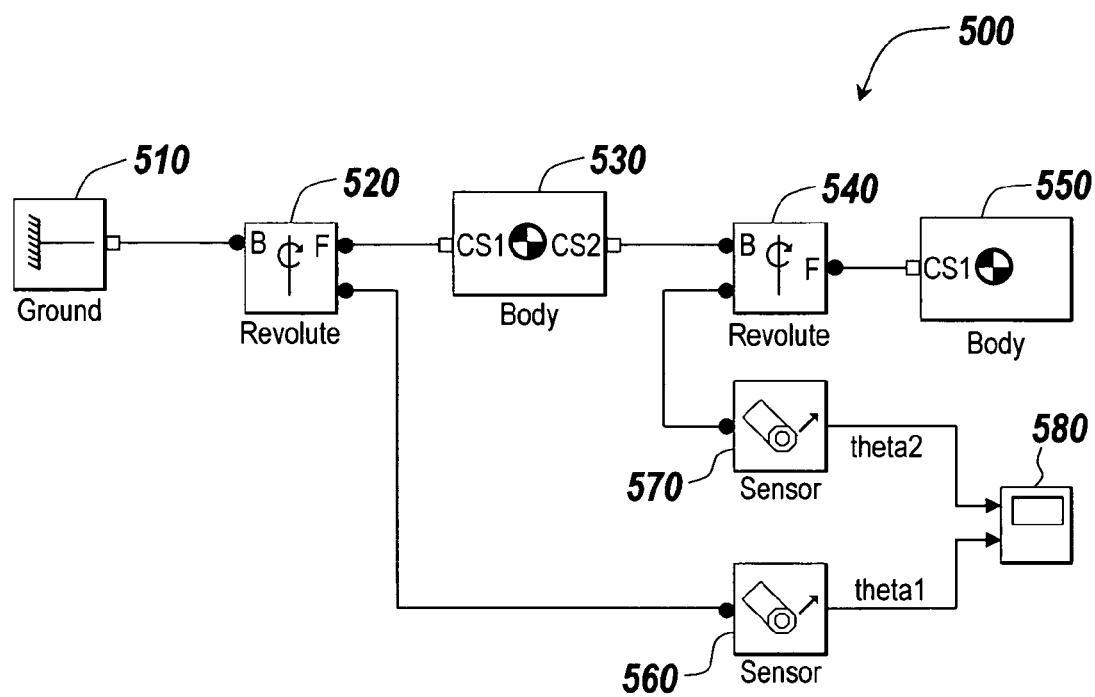
FIG. 5 depicts an exemplary model for the double pendulum system depicted in FIG. 4 that is implemented in a physical modeling environment.

FIG. 4 depicts an exemplary double pendulum system 400 that may be modeled and executed in the illustrative embodiment of the present invention. The double pendulum system 400 includes rigid massless wires 410 and 430 with the lengths of L1 and L2, respectively. One end of the rigid massless wires 410 and 430 has point masses M1 and M2, respectively. The angles created by the rigid massless wires 410 and 430 are designated by theta 1 ($\theta_1$) and theta 2 ($\theta_2$), respectively. FIG. 5 depicts an exemplary model 500 representing the double pendulum system 400 in SimMechanics. The model 500 includes a Ground block 510, Revolute blocks 520 and 540, Body blocks 530 and 550, Sensor blocks 560 and 570, and a Scope block 580. The ground block 510 represents a ground or ground point that is a special point fixed at rest in an absolute or global inertial reference frame. The ground block 510 has an associated grounded coordinate system. The Body blocks 530 and 550 represent the rigid massless wires 410 and 430 with point masses M1 and M2, respectively. The Body blocks 530 and 550 are characterized by the mass, inertias and coordinate system of the rigid massless wires 410 and 430. The Revolute block 520 connects the Ground block 510 with the Body block 530 and represents the rotational degrees of freedom (DoFs) of the rigid massless wire 410 with respect to the ground. The Revolute block 540 connects the Body blocks 530 and 550 and represents the rotational DoFs of the rigid massless wire 430 with respect to the other rigid massless wire 410. The Sensor blocks measure the angles (theta1 and theta2) created by the rigid massless wires 410 and 430. The Sensor blocks 560 and 570 have a connector port for connecting with the Revolute blocks 520 and 540 and an outport for connecting with normal Simulink® blocks, such as the Scope block 580 in which the measured angles are displayed.

The block diagram modeling environment 110, such as Simulink®, takes the model 500 designed in the physical modeling environment 130 and describes or converts the model 500 in a linearly-implicit formulation of ODEs or DAEs that can be executed in the block diagram modeling environment 110 (step 330 in FIG. 3). To describe model 500 using the linearly-implicit formulation of ODEs in the block diagram modeling environment 110, the equations of motion for the double pendulum system 400 depicted in FIG. 4 may be written as follows.

$(m_1+m_2)L_1\ddot{\theta}_1+m_2L_2\ddot{\theta}_2\cos(\theta_1-\theta_2)=-m_2L_2\dot{\theta}_2^2\sin(\theta_1-\theta_2)-g(m_1+m_2)\sin\theta_1$
$L_1\dot{\theta}_1\cos(\theta_1-\theta_2)+L_2$
$\ddot{\theta}_2=L_1\dot{\theta}_1^2\sin(\theta_1-\theta_2)-g\sin\theta_2$ Substituting a state vector $x=(\theta_1,\theta_2,\dot{\theta}_1,\dot{\theta}_2)$ in which $\dot{\theta}_1$ and $\dot{\theta}_2$ are the derivatives of $\theta_1$ and $\theta_2$, the equations can be written in a linearly-implicit formulation of ODEs, $M(t,x,y)\dot{x}=f(t,x,y)$, as follows.

$$\begin{bmatrix} 1 & 0 & 0 & 0 \\ 0 & 1 & 0 & 0 \\ 0 & 0 & (m_1+m_2)L_1 & m_2L_2\cos(\theta_1-\theta_2) \\ 0 & 0 & L_1\cos(\theta_1-\theta_2) & L_2 \end{bmatrix}$$

$$\left(\begin{bmatrix} \theta_1 \\ \theta_2 \\ \dot{\theta}_1 \\ \dot{\theta}_2 \end{bmatrix}\right)' = \begin{bmatrix} \dot{\theta}_1 \\ \dot{\theta}_2 \\ -m_2L_2\dot{\theta}_2^2\sin(\theta_1-\theta_2)-g(m_1+m_2)\sin\theta_1 \\ L_1\dot{\theta}_1^2\sin(\theta_1-\theta_2)-g\sin\theta_2 \end{bmatrix}$$

From the equations set forth above, Simulink® can determine a mass matrix $$M(t,x,y) \text{ as } \begin{bmatrix} 1 & 0 & 0 & 0 \\ 0 & 1 & 0 & 0 \\ 0 & 0 & (m_1+m_2)L_1 & m_2L_2\cos(\theta_1-\theta_2) \\ 0 & 0 & L_1\cos(\theta_1-\theta_2) & L_2 \end{bmatrix},$$

and a forcing function f(t,x,y) as $$\begin{bmatrix} \dot{\theta}_1 \\ \dot{\theta}_2 \\ -m_2L_2\dot{\theta}_2^2\sin(\theta_1-\theta_2)-g(m_1+m_2)\sin\theta_1 \\ L_1\dot{\theta}_1^2\sin(\theta_1-\theta_2)-g\sin\theta_2 \end{bmatrix}.$$

One of skill in the art will appreciate that the exemplary double pendulum system described above as a system depending on only state variables is for only illustrative purposes, and the present invention may applied to time, state and input dependent systems in which the mass matrix M(t,x,y) and forcing function f(t,x,y) may depend on time, state and input variables.

Figure 6A:
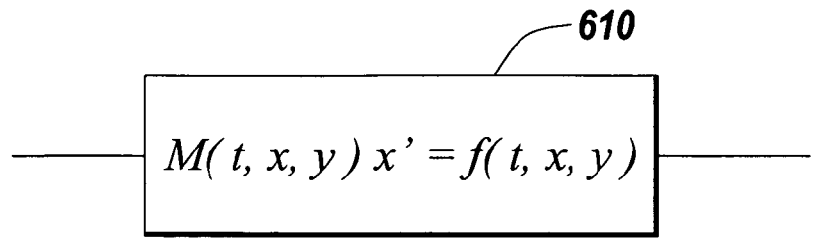
FIG. 6A is an exemplary block that represents a system described using a linearly-implicit formulation of ODEs in a block diagram modeling environment.

FIG. 6A depicts an exemplary block 610 generated in the block diagram modeling environment 110 to represent a system described in a linearly-implicit formulation of ODEs. The block 610 represents a system modeled and executed in the formulation of $M(t,x,y)\dot{x}=f(t,x,y)$ in the block diagram modeling environment 110. The mass matrix M(t,x,y) may be a sparse matrix, which will be described below in more detail with reference to FIG. 8. The mass matrix M(t,x,y) may or may not be singular. If the mass matrix is singular, the block

610 may represent a system that includes algebraic loops in the block diagram representation of the system.

Figure 6B:
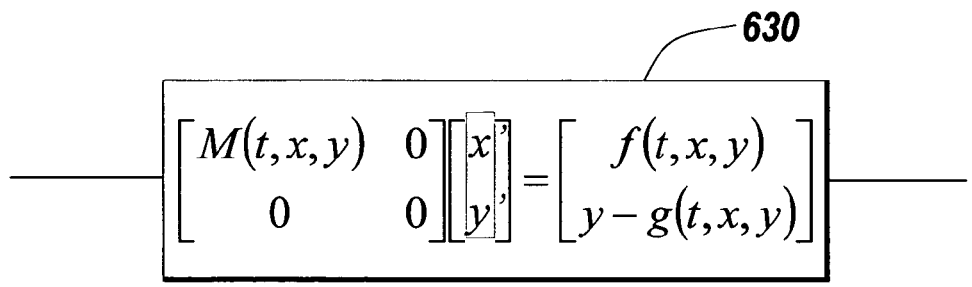
FIG. 6B is another exemplary block that represents a system described using a linearly-implicit formulation of DAEs in a block diagram modeling environment.

FIG. 6B depicts an exemplary block 630 that represents a system described in a linearly-implicit formulation of DAEs. Assuming an Output equation is provided as y−g(t, x, y)=0, the Output equation may be combined with the linearly-implicit formulation of ODEs as follows.

$$\begin{bmatrix} M(t, x, y) & 0 \\ 0 & 0 \end{bmatrix} \begin{bmatrix} \dot{x} \\ \dot{y} \end{bmatrix} = \begin{bmatrix} f(t, x, y) \\ y - g(t, x, y) \end{bmatrix}$$

The block 630 represents a system described in a linearly-implicit formulation of DAEs that contain differential equations and algebraic equations corresponding to the Derivative equations and Output equations of the system, respectively, in the block diagram modeling environment 110. In the linearly-implicit formulation of DAEs, the augmented mass matrix $$\begin{bmatrix} M(t, x, y) & 0 \\ 0 & 0 \end{bmatrix}$$

is singular. Therefore, the formulation of the block 630 may generally be used to solve systems that include algebraic loops in block diagram representation of the systems.

Figure 7:
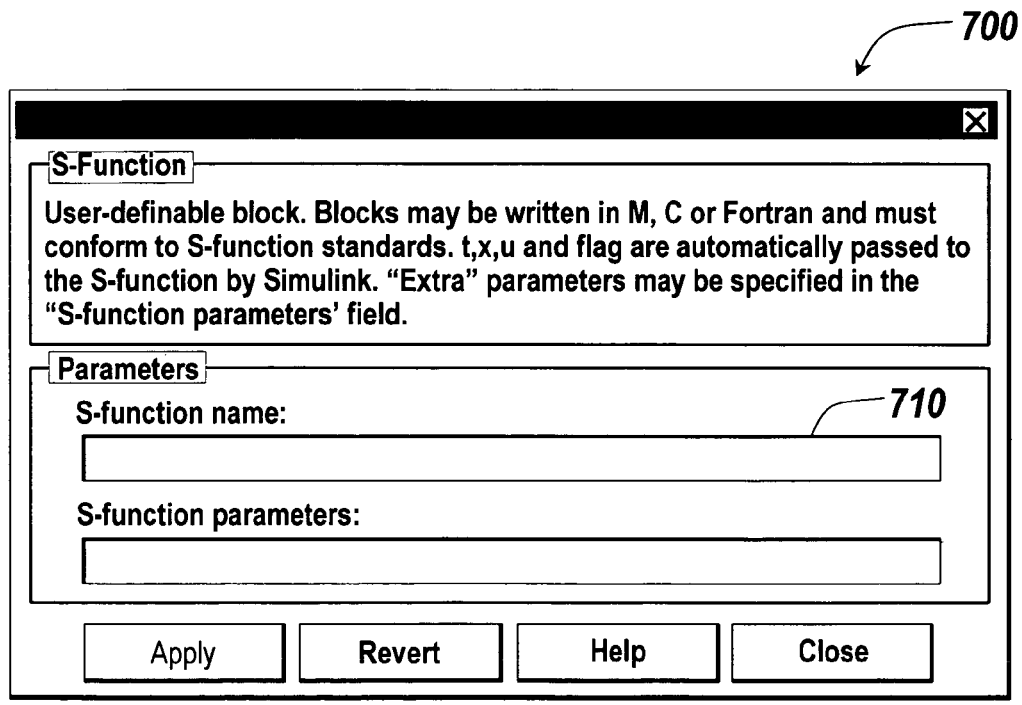
FIG. 7 depicts an exemplary user interface for designating the name of an S-function source file that defines the behavior of an S-function block.

As mentioned above, a model representing a linearly-implicit ODE or DAE system may be introduced into the block diagram modeling environment 110 from other modeling environments, such as a physical modeling environment 130. In addition, the linearly-implicit ODE or DAE system may be generated directly in the block diagram modeling environment 110 by users using a user-defined block provided in the block diagram modeling environment 110. For example, the block 610 may be created using S-functions provided in Simulink® in the illustrative embodiment of the present invention. S-functions are a computer language description of a Simulink® block that enables a user to define a system operating in the Simulink® environment. To incorporate an S-function into a Simulink® model, users may select an S-Function block from the Simulink® User-Defined Functions block library and specify the name of the S-function source file in the S-function name field of the S-Function block's dialog box. FIG. 7 depicts an exemplary user interface 700 for the S-Function block's dialog box that designates a source file. After users write S-function source file and place the S-function source file name (for example, sfcn_imp) in the S-function name field 710, users can create an S-function block. The S-function source files may be written in various programming languages including MATLAB®, C or other programming languages such as C++, Ada, Fortran, etc. The S-functions written in other languages than MATLAB® are compiled using the MEX command in MATLAB® to make a file that is executable in the Simulink® environment. The MEX-files are dynamically linked into MATLAB®. S-functions use a special calling syntax that enables users to interact with Simulink® equation solvers. This interaction is very similar to the interaction that takes place between the solvers and built-in Simulink® blocks. The form of an S-function is very general and can accommodate continuous, discrete, and hybrid systems.

Figure 8:
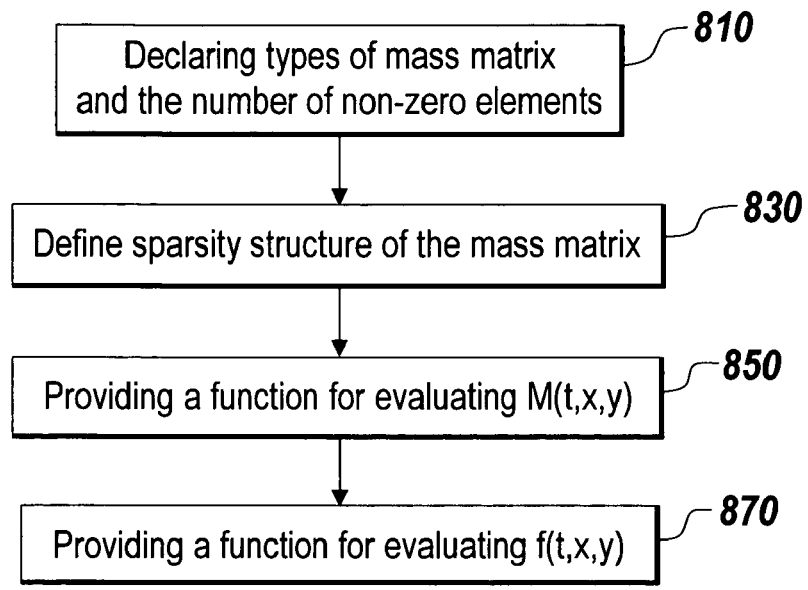
FIG. 8 is a flow chart showing an exemplary operation to build an S-function that represents a system in a linearly-implicit formulation of ODEs.

FIG. 8 is a flow chart showing an exemplary operation to build an S-function that represents a system in a linearly-implicit formulation of ODEs. First, the S-function declares the type of the mass matrix M(t,x,y) and the number of non-zero elements in the mass matrix M(t,x,y) (step 810). The types of mass matrix may include a full matrix and a sparse matrix. A full matrix is defined with all of the elements of the matrix, including zero elements in the matrix. A sparse matrix is defined with the nonzero elements of the matrix and the locations of the nonzero elements in the mass matrix. The sparse matrix generally contains a small portion of nonzero elements, which provides advantages in matrix storage space and computation time. The number of nonzero elements may enable the allocation of memory space for the sparse mass matrix. One of skill in the art will appreciate that although the illustrative embodiment is described in relation to the sparse mass matrix, another embodiment of the present invention may be practice with a full mass matrix. The S-function also defines the sparsity structure of a sparse mass matrix (step 830). The sparsity structure identifies the location of the non-zero elements in the sparse mass matrix. The S-function provides a function for evaluating the mass matrix M(t,x,y) (step 850). The S-function also provides a function for evaluating a forcing function f(t,x,y) (step 870).

The following is an exemplary code for a C MEX file that implements an S-function for the model 400 described in a linearly-implicit formulation of ODEs. The name of the S-function is designated sfcn_imp that is the same as depicted in FIG. 7. The exemplary code also includes portions that implement the steps illustrated above with reference to FIG. 8.

```
/* S-Function defines a linearly-implicit system *
 * of ODEs, describing motion of double pendulum *
 */
#define S_FUNCTION_NAME sfcn_imp
#define S_FUNCTION_LEVEL 2
#include <math.h>
#include "simstruc.h"
/*====================*
 * S-function methods *
 *====================*/
/* Function: mdlInitializeSizes ===========================================
 * Abstract:
 *    The sizes information is used by Simulink ® to determine the S-function
 *    block's characteristics (number of inputs, outputs, states, etc.).
 */
static void mdlInitializeSizes(SimStruct *S)
{
    .
    .
```

-continued

```
   .
   .
  /* Declare the type and size of the MassMatrix */
  ssSetMassMatrixType(S, SS_MATRIX_STATEDEP); /* M(x) */
  ssSetMassMatrixNzMax(S, 6); /* 6 non-zero elements */
} /* mdlInitializeSizes */
   .
   .
   .

#define MDL_START
/* Function: mdlStart =======================================
 * Abstract:
 *    Define the non-zero structure of MassMatrix
 */
static void mdlStart(SimStruct *S)
{
  Int_T *Ir   = ssGetMassMatrixIr(S);
  Int_T *Jc   = ssGetMassMatrixJc(S);
  Jc[0] = 0; Ir[0] = 0; /* M(1,1) */
  Jc[1] = 1; Ir[1] = 1; /* M(2,2) */
  Jc[2] = 2; Ir[2] = 2; Ir[3] = 3; /* M(3,3), M(3,4) */
  Jc[3] = 4; Ir[4] = 2; Ir[5] = 3; /* M(4,3), M(4,4) */
  Jc[4] = 6; /* nnz */
}/* end mdlStart */
   .
   .
   .

# define MDL_MASSMATRIX
/* Function: mdlMassMatrix ============================================
 * Abstract:
 *    Evaluate the MassMatrix
 */
static void mdlMassMatrix(SimStruct *S)
{
  real_T g = 9.81;
  real_T L1 = 1.0;
  real_T m1 = 3.0;
  real_T L2 = 2.0;
  real_T m2 = 5.0;
  real_T *x = ssGetContStates(S);
  real_T t1 = x[0]
  real_T t2 = x[1];
  real_T *M = ssGetMassMatrixPr(S);
  M[0] = 1.0;      /* M(1,1) */
  M[1] = 1.0;      /* M(2,2) */
  M[2] = (m1+m2)*L1;     /* M(3,3) */
  M[3] = L1*cos(t1-t2);  /* M(4,3) */
  M[4] = m2*L2*cos(t1-t2);  /* M(3,4) */
  M[5] = L2;       /* M(4,4) */
} /* end mdlMassMatrix */
#define MDL_FORCINGFUNCTION
/* Function: mdlForcingFunction ===========================================
 * Abstract:
 *    Compute Forcing Function, the RHS of the linearly-implicit ODE system
 */
static void mdlForcingFunction(SimStruct *S)
{
  real_T g = 9.81;
  real_T L1 = 1.0;
  real_T m1 = 3.0;
  real_T L2 = 2.0;
  real_T m2 = 5.0;
  real_T *x = ssGetContStates(S);
  real_T t1 = x[0];
  real_T t2 = x[1];
  real_T t1dot = x[2];
  real_T t2dot = x[3];
  real_T *F = ssGetdX(S);
  F[0] = t1dot;
  F[1] = t2dot;
  F[2] = -m2*L2*sin(t1-t2)*t2dot*t2dot - (m1+m2)*g*sin(t1);
  F[3] =   L1*sin(t1-t2)*t1dot*t1dot -    g*sin(t2);
} /* end mdlForcingFunction */
/* Function: mdlTerminate =================================================
 * Abstract:
 *    No termination needed, but we are required to have this routine.
 */
static void mdlTerminate(SimStruct *S)
{
} /* end mdlTerminate */
```

-continued

```
#ifdef MATLAB_MEX_FILE   /* Is this file being compiled as a MEX-file? */
#include "simulink.c"    /* MEX-file interface mechanism */
#else
#include "cg_sfun.h"     /* Code generation registration function */
#endif
```

In response to users' requests to execute the model 400 implemented in a linearly-implicit formulation of ODEs in the block diagram modeling environment 110, the block diagram modeling environment 110 executes the model 400 to simulate the behavior of the model 400 (step 350 in FIG. 3). The illustrative embodiment implements methods for simulating Simulink® models described in a linearly-implicit formulation of ODEs or DAEs, such as ODE15S and ODE23T. The solvers integrate the linearly-implicit ODE or DAE system between specified time points with given initial conditions. The illustrative embodiment may exploit the sparsity structure of the mass matrix M(t,x,y) to execute the system modeled in the linearly-implicit formulation of ODEs or DAEs and to save time for executing the model of the system. The solvers can solve the equations of the system even when the mass matrix is singular. The algorithms that the solvers use may differ depending on the order of accuracy and the type of systems the solvers are designed to solve. For example, ODE15S is a variable order solver based on Numerical Differentiation Formulas (NDF). ODE23T is an implementation of the trapezoidal rule using a free interpolant.

Figure 9:
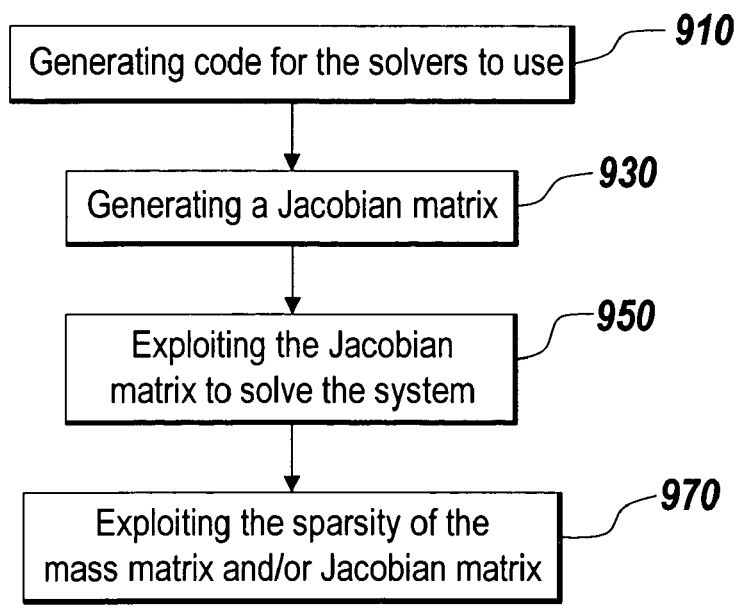
FIG. 9 is a flow chart that shows an exemplary operation for solving linearly-implicit ODE systems in a block diagram modeling environment.

FIG. 9 is a flow chart showing an exemplary operation for solving linearly-implicit ODE or DAE systems in the illustrative embodiment of the present invention. In solving the ODE or DAE systems, the illustrative embodiment may generate code from the linearly-implicit formulation of ODEs or DAEs (step 910). The code may include functions for evaluating the mass matrix M(t,x,y) and the forcing function f(t,x,y) as a form that solvers can use. Users may select a solver that is applied to execute the systems. The selected solver is provided with the functions describing the system in a linearly-implicit formulation of ODEs or DAEs, the time interval on which the system is solved and an initial condition vector. The solver may further be provided with additional information to solve the model of the systems, for example, the sparsity structure of the mass matrix. The illustrative embodiment may also exploit a Jacobian matrix $$J = \frac{\partial f}{\partial x}$$

defined as a matrix of partial derivatives of the forcing function to solve the model of the system (step 930). The Jacobian matrix is used to linearize the forcing function f(t,x,y) at a point where the system is solved (step 950). If the Jacobian matrix is a sparse matrix, the illustrative embodiment may also exploit the sparsity structure of the Jacobian matrix as well as the sparsity structure of the mass matrix to save time for executing the model of the system (step 970).

In summary, the illustrative embodiment of the present invention describes a system in a linearly-implicit formulation of ODEs or DAEs within a block diagram modeling environment. The linearly-implicit formulation of ODEs or DAEs characterizes the system using a mass matrix and a forcing function. In the linearly-implicit formulation of DAEs, the mass matrix is singular, which implies that the block diagram representation of the system may include algebraic loops. Thus, the illustrative embodiment of the present invention may provide a general solution for solving a system that includes an algebraic loop in the block diagram modeling environment. The model of the system may be originated from other modeling environments, such a physical modeling environment. The model of the system may also be created directly from users using a user-defined block, such as S-functions provided in Simulink®. The illustrative embodiment of the present invention may exploit the sparsity structure of the mass matrix to execute the model of the system. A sparse matrix is characterized by nonzero elements and the locations of the nonzero elements in the matrix. The sparse matrix contains only a small portion of nonzero elements, which saves memory space for storing the elements of the mass matrix and reduces execution time to solve the equations. In the process of solving ODEs or DAEs, the illustrative embodiment of the present invention may also generate a Jacobian matrix. The Jacobian matrix is defined here as the partial derivatives of the forcing function with respect to the state variables. The sparsity of the Jacobian matrix may also be exploited if the Jacobian matrix is a sparse matrix.

It will thus be seen that the invention attains the objectives stated in the previous description. Since geometric changes may be made without departing from the scope of the present invention, it is intended that all matter contained in the above description or shown in the accompanying drawings be interpreted as illustrative and not in a literal sense. For example, the illustrative embodiment of the present invention may be practiced with any models that may be mathematically described in a linearly-implicit formulation of ODEs or DAEs in a block diagram modeling environment. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method comprising:
   analyzing, using a processor of an electronic device, a block diagram model of a physical dynamic system in a block diagram modeling environment, the analyzing comprising:
   deriving from the block diagram model a set of equations describing the behavior of the system, the set of equations comprising at least one of ordinary differential equations (ODEs) and differential algebraic equations (DAEs), and
   determining a mass matrix M(t,x,y) and a forcing function f(t,x,y) from the set of equations, wherein t, x, and y represent time, states and outputs, respectively;
   generating, using the processor of the electronic device, a linearly-implicit formulation of the set of equations based on the analyzing, wherein the linearly-implicit formulation includes $$M(t,x,y)\dot{x} = f(t,x,y);$$

solving, using the processor of the electronic device, the linearly-implicit formulation of ODEs or DAEs in the block diagram environment to generate a solution; and executing the model of the physical dynamic system using the solution to simulate the behavior of the physical dynamic system.

2. The method of claim 1 wherein the block diagram modeling environment includes a time-based block diagram modeling environment.

3. The method of claim 1 wherein the block diagram modeling environment includes a state-based and flow diagram modeling environment.

4. The method of claim 1 wherein the block diagram modeling environment includes a data flow modeling environment.

5. The method of claim 1 wherein the block diagram modeling environment is coupled to a physical modeling environment.

6. The method of claim 5 further comprising:
modeling, using the electronic device, the system in the physical modeling environment; and
converting, using the electronic device, the system to a block that represents the linearly-implicit formulation of ODEs or DAEs in the block diagram modeling environment.

7. The method of claim 1 wherein the system includes an algebraic loop and the method further comprises:
converting, using the electronic device, the algebraic loop to a form represented by $$\begin{bmatrix} M(t,x,y) & 0 \\ 0 & 0 \end{bmatrix} \begin{bmatrix} \dot{x} \\ \dot{y} \end{bmatrix} = \begin{bmatrix} f(t,x,y) \\ y - g(t,x,y) \end{bmatrix},$$

wherein an augmented mass matrix $$\begin{bmatrix} M(t,x,y) & 0 \\ 0 & 0 \end{bmatrix}$$

is singular.

8. The method of claim 1 further comprising:
generating, using the electronic device, a second matrix from the mass matrix, the second matrix having one or more nonzero elements of the mass matrix and locations, in the mass matrix, of the one or more nonzero elements.

9. The method of claim 8, wherein a computation time associated with solving the linearly-implicit formulation is reduced using the second matrix.

10. The method of claim 1 further comprising:
generating, using the electronic device, a Jacobian $$J = \frac{\partial f}{\partial x}$$

defined as a derivative of f with respect to the states x.

11. The method of claim 1 further comprising:
generating, using the electronic device, a Jacobian using a derivative of M(t,x,y)ẋ with respect to state x.

12. The method of claim 10 wherein the Jacobian is a Jacobian matrix, the method further comprising:
generating, using the electronic device, a second matrix from the Jacobian matrix, the second matrix having one or more nonzero elements of the Jacobian matrix and locations, in the Jacobian matrix, of the one or more nonzero elements.

13. The method of claim 12 wherein a computation time associated with solving the linearly-implicit formulation is reduced using the second matrix.

14. The method of claim 10 wherein the Jacobian is used to linearize a nonlinear system at a given point.

15. A method for modeling a physical dynamic system in a block diagram modeling environment, the method comprising:
analyzing, using a processor of an electronic device, a block diagram model of the physical dynamic system in a block diagram modeling environment, the analyzing comprising:
deriving from the block diagram model a set of emotions describing the behavior of the system, the set of equations comprising at least one of ordinary differential equations (ODES) and differential algebraic equations (DAEs), and
determining a mass matrix M(t,x,y) and a forcing function f(t,x,y) from the set of equations, wherein t, x, and y represent time, states and outputs, respectively;
describing, using the processor of the electronic device, the physical dynamic system in a linearly-implicit formulation of the set of equations, in the block diagram modeling environment, that includes $$M(t,x,y)\dot{x} = f(t,x,y);$$

determining, using the electronic device, a type of the mass matrix and a number of non-zero elements in the mass matrix;
determining, using the electronic device, a sparsity structure of the mass matrix, the sparsity structure identifying locations of non-zero elements in the mass matrix;
generating, using the electronic device, a first function for evaluating M(t,x,y);
generating, using the electronic device, a second function for evaluating f(t,x,y);
generating, using the electronic device, a set of differential equations, in the block diagram modeling environment, based on the mass matrix, sparsity structure, first function and second function; and
executing the model of the physical dynamic system to simulate the behavior of the physical dynamic system, the executing including solving the set of differential equations to generate a solution which is used in the execution of the model.

16. The method of claim 15 further comprising:
defining, using the electronic device, a block that implements the system.

17. The method of claim 16 wherein the block includes an S-function block.

18. The method of claim 15 wherein the system includes an algebraic loop and the mass matrix is singular.

19. The method of claim 15 wherein the system is represented in one or more differential algebraic equations (DAEs).

20. The method of claim 15, wherein a computation time associated with solving the set of differential equations is reduced based on the sparsity structure of the mass matrix.

21. A computer-readable medium holding instructions executable by an electronic device, the medium comprising one or more instructions for:
analyzing, using the electronic device, a block diagram model of a physical dynamic system in a block diagram modeling environment, the analyzing comprising:

deriving from the block diagram model a set of equations describing the behavior of the system, the set of equations comprising at least one of ordinary differential equations (ODEs) and differential algebraic equations (DAEs), and determining a mass matrix M(t,x,y) and a forcing function f(t,x,y) from the set of equations, wherein t, x, and y represent time, states and outputs, respectively;

generating, using the electronic device, a linearly-implicit formulation of the set of equations based on the analyzing, wherein the linearly-implicit formulation of ordinary differential equations includes $$M(t,x,y)\dot{x}=f(t,x,y); \text{ and}$$

executing the model of the physical dynamic system to simulate the behavior of the physical dynamic system, the executing including solving the linearly-implicit formulation of the set of equations, in the block diagram environment, to generate a solution which is used in the execution of the model.

22. The computer-readable medium of claim 21 wherein the block diagram modeling environment includes a time-based block diagram modeling environment.

23. The computer-readable medium of claim 21 wherein the block diagram modeling environment includes a state-based and flow diagram modeling environment.

24. The computer-readable medium of claim 21 wherein the block diagram modeling environment includes a data flow modeling environment.

25. The computer-readable medium of claim 21 wherein the block diagram modeling environment is coupled to a physical modeling environment.

26. The computer-readable medium of claim 21 wherein the system includes an algebraic loop, and wherein the computer-readable medium further comprises one or more instructions for:

converting, using the electronic device, the algebraic form to a form represented by $$\begin{bmatrix} M(t,x,y) & 0 \\ 0 & 0 \end{bmatrix} \begin{bmatrix} \dot{x} \\ \dot{y} \end{bmatrix} = \begin{bmatrix} f(t,x,y) \\ y-g(t,x,y) \end{bmatrix},$$

wherein an augmented mass matrix is $$\begin{bmatrix} M(t,x,y) & 0 \\ 0 & 0 \end{bmatrix}$$

is singular.

27. A computer-readable medium holding instructions executable in an electronic device for modeling a physical dynamic system in a block diagram modeling environment the medium holding one or more instructions for:

analyzing, using a processor of an electronic device, a block diagram model of the physical dynamic system in a block diagram modeling environment, the analyzing comprising:

deriving from the block diagram model a set of equations describing the behavior of the system, the set of equations comprising at least one of ordinary differential equations (ODEs) and differential algebraic equations (DAEs), and determining a mass matrix M(t,x,y) and a forcing function f(t,x,y) from the set of equations, wherein t, x, and y represent time, states and outputs, respectively;

describing, using an electronic device, the physical dynamic system in a linearly-implicit formulation of the set of equations, in the block diagram modeling environment, that includes $$M(t,x,y)\dot{x}=f(t,x,y)$$

determining, using the electronic device, a type of the mass matrix and a number of non-zero elements in the mass matrix;

determining, using the electronic device, a sparsity structure of the mass matrix, the sparsity structure identifying locations of non-zero elements in the mass matrix;

generating, using the electronic device, a first function for evaluating M(t,x,y);

generating, using the electronic device, a second function for evaluating f(t,x,y);

generating, using the electronic device, a set of differential equations, in the block diagram modeling environment, based on the mass matrix, sparsity structure, first function and second function; and executing the model of the physical dynamic system to simulate the behavior of the physical dynamic system, the executing including solving the set of differential equations to generate a solution which is used in the execution of the model.

28. The computer-readable medium of claim 27 wherein the sparsity structure contains one or more nonzero elements of the mass matrix.

29. The computer-readable medium of claim 28 wherein the sparsity structure contains a location in the mass matrix of the one or more nonzero elements.

30. The computer-readable medium of claim 27 further comprising:

instructions for defining a block that implements the system.

31. An apparatus comprising:

a memory storing instructions for providing a block diagram modeling environment; and a processor configured to:

provide a block diagram modeling environment;

analyze a block diagram model of a physical dynamic system in the block diagram modeling environment, the analyzing comprising:

deriving from the block diagram model a set of equations describing the behavior of the system, the set of equations comprising at least one of ordinary differential equations (ODEs) and differential algebraic equations (DAEs), and determining a mass matrix M(t,x,y) and a forcing function f(t,x,y) from the set of equations, wherein t, x, and y represent time, states and outputs, respectively;

generate a linearly-implicit formulation of the set of equations based on the analyzing, wherein the linearly-implicit formulation includes $$M(t,x,y)\dot{x}=f(t,x,y), \text{ and}$$

execute the model of the physical dynamic system to simulate the behavior of the physical dynamic system, the execution including solving the linearly-implicit formulation of the set of equations in the block diagram environment to generate a solution which is used in the execution of the model.

32. The apparatus of claim 31, wherein the block diagram modeling environment comprises one of a time-based block diagram modeling environment, a state-based and flow diagram modeling environment, or a data flow modeling environment.

33. The apparatus of claim 31, wherein the system includes an algebraic loop and the processor is further configured to:
   convert the algebraic loop to a form represented by $$\begin{bmatrix} M(t,x,y) & 0 \\ 0 & 0 \end{bmatrix} \begin{bmatrix} \dot{x} \\ \dot{y} \end{bmatrix} = \begin{bmatrix} f(t,x,y) \\ y - g(t,x,y) \end{bmatrix},$$

wherein an augmented mass matrix $$\begin{bmatrix} M(t,x,y) & 0 \\ 0 & 0 \end{bmatrix}$$

is singular.

34. The apparatus of claim 31 wherein the processor is further configured to:
   generate a second matrix from the mass matrix, the second matrix having one or more nonzero elements of the mass matrix and the location, in the mass matrix, of the one or more nonzero elements.

35. The apparatus of claim 31, wherein a computation time associated with solving the linearly-implicit formulation is reduced using the second matrix.

36. The apparatus of claim 31, wherein the processor is further configured to:
   generate a Jacobian $$J = \frac{\partial f}{\partial x}$$

defined as a derivative of f with respect to the states x.

37. The apparatus of claim 36, wherein the processor is further configured to:
   use the Jacobian to linearize a nonlinear system at a given point.

38. The apparatus of claim 31, wherein the model comprises a user-defined block that implements the system.

39. The apparatus of claim 38, wherein the user-defined block includes an S-function block.

40. The method of claim 1, further comprising storing a result of the execution of the model in a memory associated with the electronic device.

* * * * *

UNITED STATES PATENT AND TRADEMARK OFFICE
CERTIFICATE OF CORRECTION

PATENT NO. : 7,739,081 B1 Page 1 of 1
APPLICATION NO. : 10/903168
DATED : June 15, 2010
INVENTOR(S) : Jacek Kierzenka et al.

It is certified that error appears in the above-identified patent and that said Letters Patent is hereby corrected as shown below:

At column 16, line 16 (claim 15, line 8) of the printed patent, please change "emotions" to --equations--.

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,739,081 B1 | Page 1 of 1 |
| APPLICATION NO. | : 10/903168 | |
| DATED | : June 15, 2010 | |
| INVENTOR(S) | : Jacek Kierzenka et al. | |

It is certified that error appears in the above-identified patent and that said Letters Patent is hereby corrected as shown below:

On the Title Page, at Item (73) Assignee, replace "The Math Works, Inc." with --The MathWorks, Inc.--.

Signed and Sealed this
Eighteenth Day of November, 2014

Michelle K. Lee
*Deputy Director of the United States Patent and Trademark Office*